Jan. 9, 1951  G. HARDING  2,537,269
SPINDLE POSITIONING DEVICE
Filed March 18, 1948  2 Sheets-Sheet 1
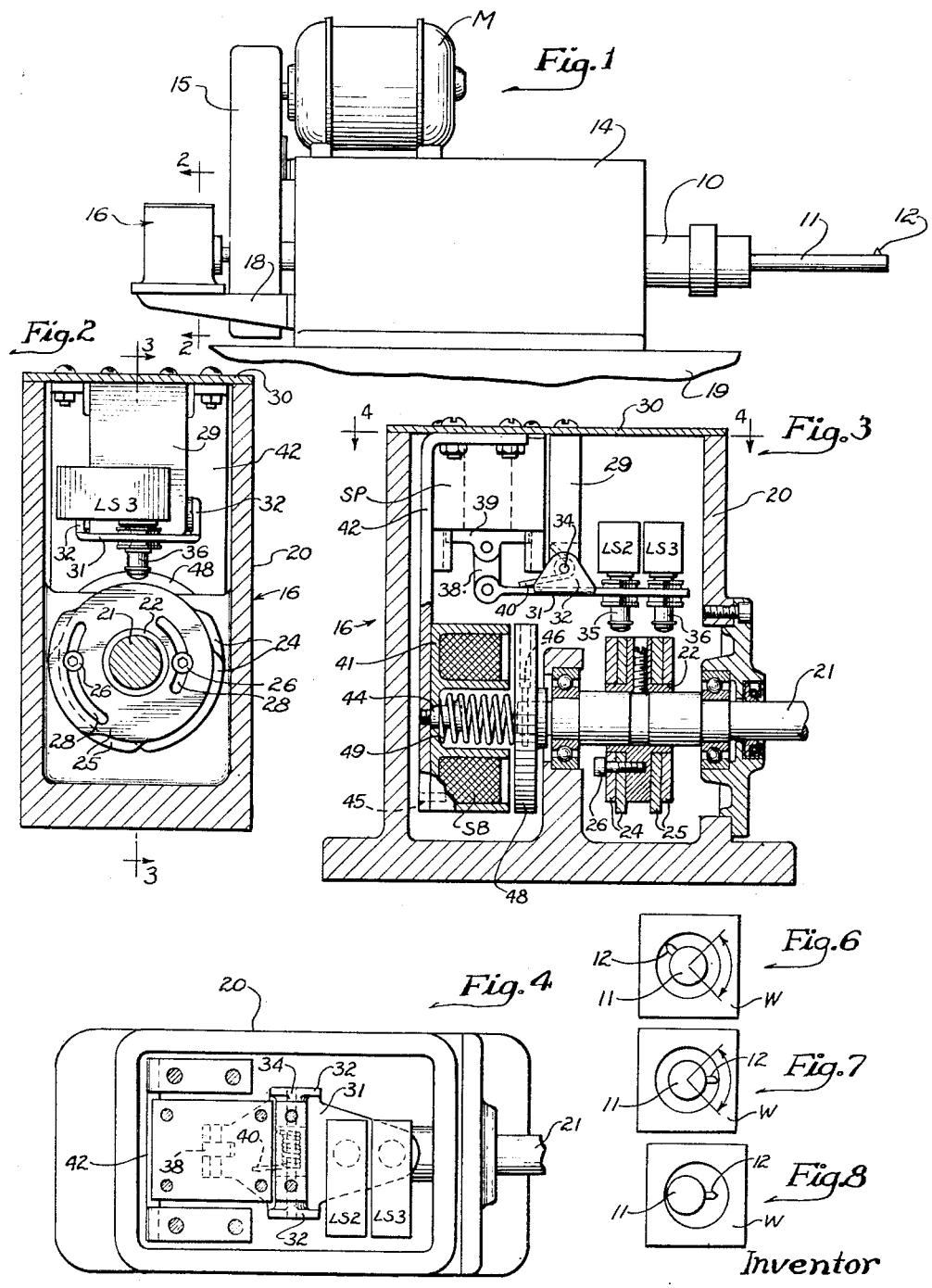
Inventor
Grant Harding
by: Carlson, Pitzner, Hubbard & Wolfe
attys.

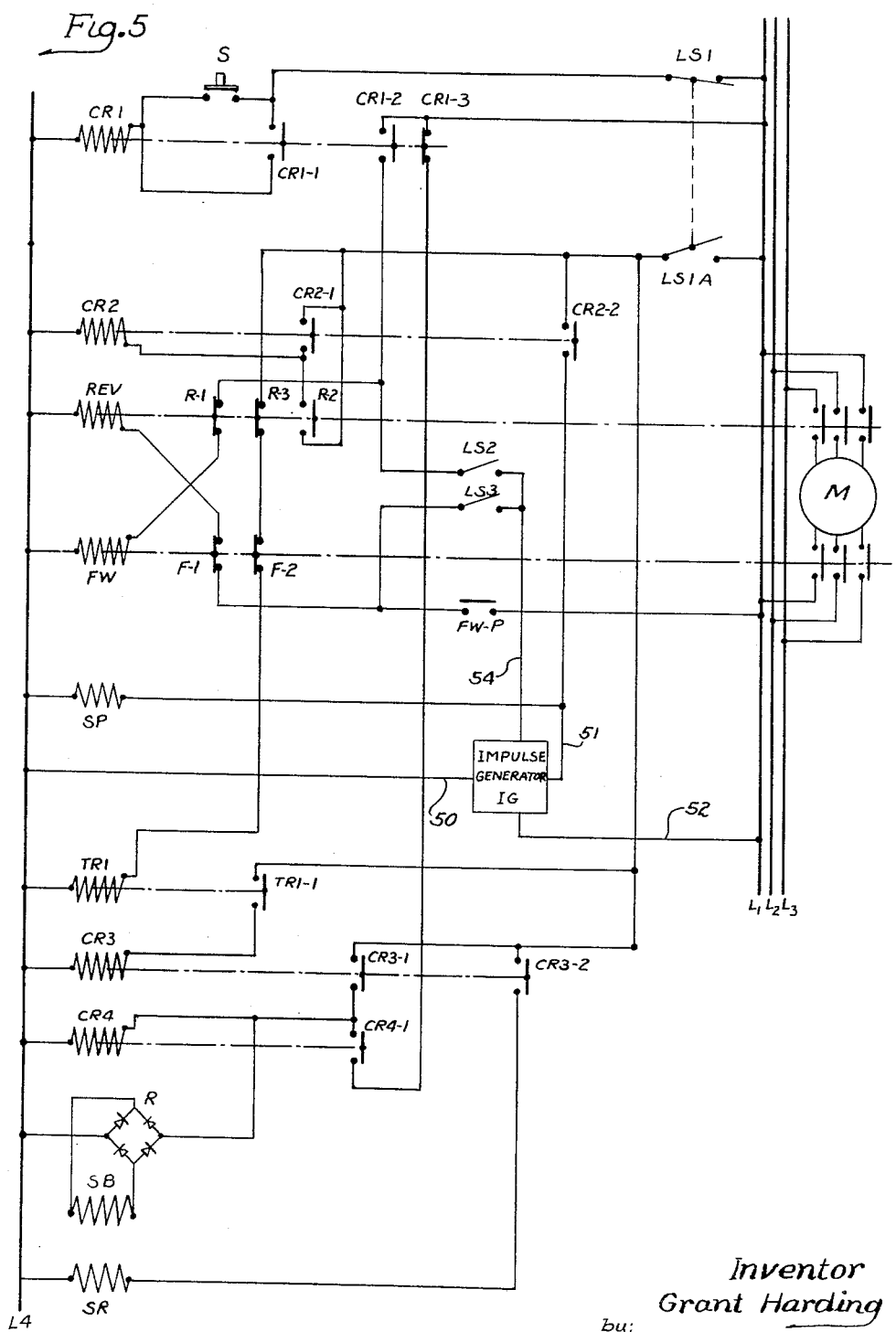

Patented Jan. 9, 1951

2,537,269

UNITED STATES PATENT OFFICE 2,537,269

SPINDLE POSITIONING DEVICE

Grant Harding, Detroit, Mich., assignor to Ex-Cell-O Corporation, Detroit, Mich., a corporation of Michigan Application March 18, 1948, Serial No. 15,662

8 Claims. (Cl. 318—443)

The present invention pertains generally to machine tools and more specifically to a novel spindle positioning control device which is particularly well adapted for use in boring machines of the single or multiple spindle type.

Machines of this character are customarily used for boring operations on hollow workpieces such as cylinder blocks which have been previously formed with one or more cylinder openings therein. After the workpiece has been mounted on an appropriate work support, a single point boring tool carried by a rotatable boring bar and spindle is moved axially through each cylinder opening in the workpiece, the axis of each boring bar being fixed and coincident with that of the particular bore operated upon. With the above arrangement, if the boring bars be retracted from their respective bores in the workpiece, an objectionable tool drag-out groove which may be either of spiral or linear form is produced longitudinally along each finished bore. Imperfections of this nature are, of course, highly undesirable in precision boring operations.

A number of solutions have been advanced for coping with the foregoing problem, some of them involving shifting of the workpiece laterally relative to the axis of the boring spindle prior to retraction of the boring bar. It is with a novel and improved control device for facilitating such action that the present invention is particularly concerned.

One of the objects of the invention is to provide control means for moving a tool spindle into a radial position falling within a predetermined angular range prior to effecting a lateral separation of the machined surface of the workpiece and the point of the boring tool.

Another object is to provide a device of the character set forth which will preclude retraction of the tool from the bore of the work piece until the spindle and its associated parts have assumed a desired radial position.

A further object is to provide a device of the character set forth having a novel electrical control system for correlating the angular movements of the spindle and the linear movements of the spindle carrying means.

Other objects and advantages will become apparent as the following detailed description proceeds, taken in connection with the accompanying drawings, in which:

Figure 1 is a fragmentary side view of a boring machine embodying the invention and showing the spindle drive and spindle carrying slide.

Fig. 2 is a vertical sectional view through a unit embodying certain mechanical components of the invention, such view being taken along the line 2—2 of Fig. 1.

Fig. 3 is a vertical sectional view taken longitudinally through the unit of Fig. 1 and along the line 3—3 of Fig. 2.

Fig. 4 is a horizontal sectional view through the unit of Fig. 1 and taken in the plane of the line 4—4 of Fig. 3.

Fig. 5 is a schematic diagram of certain illustrative electrical control and power circuits utilized in the practice of the invention.

Figs. 6, 7 and 8 are sequential diagrammatic views illustrating the relationship between the radial positioning of the spindle and tool point and the manipulation of the workpiece prior to retraction of the spindle.

While the invention is susceptible of various modifications and alternative constructions, a preferred embodiment has been shown in the drawings and will be herein described in some detail, but it is to be understood that there is no intention to limit the invention to the specific form disclosed, the intention being, on the contrary to cover all modifications and alternative constructions falling within the spirit and scope of the invention as expressed in the appended claims.

Referring more specifically to Figure 1, the invention is there exemplified in connection with a horizontal boring machine having a rotatable spindle 10 carrying a boring bar 11 which is provided with a laterally projecting, single point boring tool 12. The spindle 10 is journaled in a suitable tool head 14 which receives power from a driving motor M through a belt 15. A control unit 16 is mounted upon a bracket 18 which extends outwardly from the tool head 14, the unit 16 being mechanically connected to the spindle 10. In the present instance the head 14 is rigidly fixed, in a manner not detailed, to a movable slide 19 in order to obtain relative reciprocatory movement between a work support (not shown) and said spindle in a direction generally parallel to the axis of the latter. The work support may be of any form appropriate for holding a hollow workpiece W during machining operations, provided that such support and said spindle be mounted for limited relative movement laterally of the spindle axis. Although the particular machine illustrated has only a single spindle, it is obvious that a plurality of spindles could be mounted side by side upon the slide 19 and driven in unison from the single motor M through properly synchronized gearing. It is also clear that relative movement between the work support and the spindle 10 could be obtained by mounting the latter for reciprocation in the head 14. The use of such an arrangement would, however, necessitate some sort of splined coupling between the spindle and the unit 16.

Turning now to Figs. 2 to 4 inclusive, it will be noted that the control unit 16 comprises a rectangular box-like housing 20 having a cam shaft 21 journaled for rotation but restrained against axial movement therein. The shaft 21 is adapted to be directly coupled in any appropriate manner to the spindle 10 for rotation therewith. Located within the housing 20 and keyed or otherwise rigidly secured to the shaft 21 is a cam carrier 22 which has drivingly associated therewith a plurality of disc cams 24, 25, angularly adjustable with respect to each other and to the carrier 22. In the present instance, the cams 24 and 25 are respectively arranged in two axially spaced pairs, each pair behaving in effect, like a single cam. Adjustment of the cams 24, 25 may be conveniently accomplished by means of a plurality of set screws 26 which project through arcuate slots 28 in the cams. A ready expedient is thus provided for changing the effective overall cam length of either pair of the discs 24, 25. Furthermore, the relative phasing between the two pairs of discs may be shifted to provide a greater or lesser amount of "dead space" between them.

Pivotally supported from a depending fixed bracket 29 attached to the top 30 of the unit housing is a rockable bracket 31. The latter is fashioned with a pair of upstanding ears 32 having suitably alined holes therein for receiving a pivot pin 34 carried by the bracket 29. Securely fixed to one arm of the rockable bracket 31 and located on a line substantially parallel with the axis of the shaft 21 are a pair of control switches LS2, LS3 having respective actuating plungers 35, 36. The opposite arm of the rockable bracket 31 is pivotally connected as by means of a link 38 to the vertically movable core 39 of a switch-positioning solenoid SP. The latter, when energized, serves to rock the bracket 31 counterclockwise against the force of a torsional biasing spring 40 so as to bring the plungers 35, 36 of the switches LS2, LS3 into the rotational paths of the cams 24, 25. The closure of either of the switches LS2, LS3, after the boring tool 12 has finished a cut and the spindle 10 ceased to rotate, will result in the "inching" or jogging of the motor M, thereby urging the spindle 10 and shaft 21 toward a radial position falling within a predetermined angular range or area which may, for example, be as great as 90 degrees (Figs. 6 and 7). Once the spindle and tool point have been thus positioned, the workpiece W can be moved laterally relative thereto toward the predetermined angular area to obtain the necessary clearance for free withdrawal of the tool point 12 from the bore of the workpiece (Fig. 8).

For the purpose of retaining the shaft 21 and the spindle 10 in the desired radial position once it has been reached, a normally disengaged electromagnetic friction braking means is provided. This is accomplished in the present instance by means of an annular brake winding SB carried in a nonrotatable casing 41 which in turn is supported from the cover 30 of the unit by means of a depending mounting plate 42. The winding SB, together with its casing 41 is permitted a limited amount of sliding movement along the axis of the shaft 21 and within limits determined by a shoulder screw 44. The casing is secured against rotation by means of a small loosely fitting dowel or anchor pin 45 unitary with the plate 42. Fixedly attached to a shoulder at the end of the shaft 21 and retained thereon by means of a set screw 46 is a face plate 48 which is adapted to be frictionally engaged by the axially movable casing of the winding SB. These parts are normally maintained out of engagement due to the action of an axial compression spring 49 which is overcome when the winding SB is energized.

Referring next to the illustrative circuit diagram of Fig. 5, it will be perceived that power is supplied to the spindle drive motor M through the lines L1, L2 and L3 which carry three-phase alternating current. The motor M can be connected to the lines L1, L2 and L3 for rotation in a forward direction by means of a forward contactor FW. Rotation of the motor in a reverse direction can be accomplished by connecting the latter to the supply lines through a reverse contactor REV. The actuating windings for these contactors as well as other control members are connected into a single phase control circuit L1—L4 which may have a lead in common with the supply circuit as shown, or alternatively might be arranged as a separate circuit operating at a stepped down voltage.

For the purpose of starting the motor M and thereby initiating a normal operating cycle, the control circuit includes a starting relay CR1 which is connected in series with a manual start button S and a limit switch LS1 actuated by the spindle-carrying slide 19. Sealing-in contacts CR1—1 operated by the relay CR1 serve to maintain the same in an energized condition upon release of the start button S. With the relay CR1 energized, a circuit is completed through the contacts CR1—2, the normally closed contacts R—1 of the reverse contactor REV and the winding of the forward contactor FW. When the slide 19 is in its initial or retracted position, the switch LS1 is closed and remains in this condition throughout the advancing movement of the slide, such movement corresponding to the axial advance of the boring bar 11 and tool point 12 through the bore of the workpiece. For the sake of reliability, it is desirable in certain instances to interpose some sort of interlock (not shown) between the slide positioning mechanism and the controls of the spindle driving motor M to prevent contact between the boring tool and the workpiece until the driving motor has been brought up to operating speed.

Provision is made for rapidly decelerating the motor M and bringing the same to a stop at the conclusion of the advancing movement of the slide 19. This is achieved in part by the use of a second limit switch LS1A also actuated by the slide 19 and adapted to be closed when the latter has reached the end of its advance. The switches LS1 and LS1A are so interlocked that when the one is open the other is closed and vice versa. Consequently, the closing of the switch LS1A results in the opening of the switch LS1, thus deenergizing the contactor FW and thereby interrupting the normal supply of power to the motor M. Once its normal supply has been interrupted, the motor M can be decelerated by the well known expedient of plugging, i. e., reversely connecting the motor leads across the power supply line. To accomplish this, a plugging switch FW—P is connected in series with the winding of the reverse contactor REV and remains closed as long as the motor turns. Once the motor has stopped, however, the switch FW—P mechanically opens and deenergizes the contactor REV leaving the motor disconnected from all power.

Means is provided for automatically bringing the spindle 10 (together with the boring bar 11 and the tool point 12) to a radial position falling within a predetermined arcuate range, should these parts lie outside such range when the motor M is first stopped. In furtherance of this purpose, there is utilized an impulse generator IG preferably of an electronic type, and which is adapted to apply to either of the contactors FW or REV a series of timed spaced energy pulses of predetermined duration and periodicity. Power from the control circuit L1—L4 is supplied to the impulse generator IG through conductors 50 and 51, the latter of the two being connected in series with the limit switch LS1A and normally open contacts CR2—2 of a relay CR2. The winding of the relay CR2 is so connected that it will become energized upon the closure of the limit switch LS1A and remain in that condition during the plugging of the motor M by means of the contactor REV. Initially, this circuit is completed through the normally open contacts R—2 of the contactor REV but when the latter becomes deenergized as the motor stops, the circuit is maintained through sealing-in contacts CR2—1. Connected in parallel with the impulse generator IG is the switch positioning solenoid SP located in the unit 16. The solenoid SP, which becomes energized simultaneously with the impulse generator, serves to rock the bracket 31 clockwise and thereby bring the plunger of either one of the limit switches LS2, LS3 into operative contact with its associated cams. With the closure of one of these switches, LS2, for example, a circuit can be completed through the impulse generator via conductors 52, 54 and the contacts R—1 to the winding of the forward motor contactor FW. The latter, as a consequence, would close momentarily a number of times in succession and thereby "inch" or jog the driving motor M so as to rotate the spindle 10 into a radial position within the predetermined angular range. On the other hand, the closure of the switch LS3 would achieve a similar result but would do so through intermittent closure of the contactor REV which would jog the motor and spindle in the opposite direction toward the desired radial position. As such position is reached, the engaged cams and switch plunger separate, opening the limit switch concerned and leaving the motor M and spindle 10 motionless.

In order to preclude actuation of the friction brake means until the spindle has been properly positioned radially, a self-resetting time delay relay TR1 may be utilized to good advantage. The preferable operating period of this relay is something greater than the interval between the pulses of the impulse generator IG. After the spindle 10 has reached its proper radial position and the time interval of the relay TR1 has elapsed, the normally open contacts TR1—1 are adapted to close and thereby to complete a circuit through the limit switch LS1A and the winding of a control relay CR3. The latter is arranged to actuate contacts CR3—1 so as to complete a circuit through the limit switch LS1A and a rectifier R which serves as a direct current power source for the winding SB of the magnetic friction brake in the unit 16. The relay CR3 is also arranged when energized to close contacts CR3—2 which are connected in series with the limit switch LS1A and a slide return control solenoid SR. The latter may, for example, be associated with a suitable control valve which can be used for initiating a return movement of the slide 19.

The limit switch LS1A will open as soon as the slide starts to return, thus deenergizing the relays TR1 and CR3 and allowing the contacts CR3—1 to open. To maintain an adequate supply of power to the rectifier R and the brake winding SB so as to hold the spindle 10 securely in its predetermined radial position as the boring bar is withdrawn from the workpiece, an additional control relay CR4 is employed. This relay is connected in series with the contacts CR3—1 and becomes energized when such contacts close. When energized, the relay CR4 closes contacts CR4—1 which serve the dual purpose of supplying power to the rectifier R and sealing in the winding of the relay CR4 so that it is unaffected by the opening of the relay CR3. To insure deenergizing of the relay CR4 and release of the magnetic friction brake after the slide 19 has returned to its initial position, the contacts CR4—1 are connected to the supply line L1 in series with the normally closed contacts CR1—3 of the starting relay CR1. When the latter is energized in response to the depression of the spindle start button S, the contacts CR1—3 open and deenergize the relay CR4 together with the rectifier R and the brake winding SB.

Although the operation of the above described device will undoubtedly be readily apparent to those skilled in the art, a brief summary might be in order at this point. Assume first that the machine is at rest with the slide 19 in a retracted position; that the limit switch LS1 is closed and the switch LS1A open; and that a hollow workpiece W has been secured in place. If the spindle start button S should now be momentarily depressed, the relay CR1 and contactor FW will become energized, starting the spindle drive motor M in the manner already described. The advance of the slide 19 can then be initiated through means such as a hydraulic control, thus moving the spindle 10, together with the boring bar 11 and the tool point 12, axially through the opening in the workpiece W. At the end of the advance stroke of the slide, the limit switch LS1A closes and, simultaneously, the limit switch LS1 opens. This deenergizes the relay CR1 and the contactor FW, interrupting the normal supply of power to the motor M. Since the latter will continue to rotate due to inertia, the plugging switch FW—P will be closed and a circuit will be completed energizing the reverse contactor REV. This connects the motor leads in reverse across the supply lines L1, L2, L3, plugging the motor M to a stop whereupon the switch FW—P will open and deenergize the contactor REV. While the latter is energized, a circuit is completed through the winding of the relay CR2 which remains energized as long as the switch LS1A is closed. This, in turn, energizes the impulse generator IG and the switch positioning solenoid SP in the unit 16.

If the spindle 10 and the tool point 12, which of course have stopped with the motor M, occupy a radial position falling outside the predetermined angular range as illustrated diagrammatically in Fig. 6, one of the limit switches LS2, LS3, will be closed by its associated cams so as to apply a series of pulses from the generator IG to either of the two contactors FW or REV. This serves to inch or jog the motor M sufficiently to rotate the spindle and tool point around to a radial position within the desired angular range, as indicated in Fig. 7. The time delay relay TR1 will thereupon effect the energizing of the magnetic brake winding SB and the slide return control solenoid SR through the relays CR3 and CR4 as described earlier above. Before the slide commences its return stroke for withdrawal of the boring bar and tool point from the workpiece W, the same is moved laterally with respect to the axis of the spindle and boring bar by any suitable means, thus providing the desired amount of clearance between the tool point 12 and the finished bore (refer to Fig. 8). Since the winding SB of the magnetic brake remains energized throughout the return stroke of the slide, there is no possibility of rotation of the spindle and consequent damage to the workpiece due to accidental contact with the tool point.

In the event that the spindle and the tool point should happen to lie within the predetermined angular range as soon as the motor M is plugged to a stop, the device would behave in the manner set forth above except for the fact that there would be no jogging of the motor M. The time delay relay TR1 would thus become effective to complete the cycle without waiting for the jogging to stop.

I claim as my invention:

1. A control device for radially positioning a rotary machine tool spindle having a driving motor, said spindle being arranged for both reciprocating and limited transverse movement relative to a work support, said device comprising the combination of electrical contactor means for controlling said motor including plugging connections for rapidly stopping the rotation of said motor and said spindle at a predetermined point during the relative reciprocating movement between said spindle and said work support, means effective upon the stopping of spindle rotation for causing said contactor means to intermittently energize said motor and thus jog said spindle into a predetermined angular position, a normally disengaged electromagnetic brake adapted when engaged to preclude rotation of said spindle, and control means for engaging said brake when said spindle has reached the predetermined angular position.

2. In a control device for radially positioning a rotary machine tool boring spindle having a driving motor, said spindle being arranged for advancing and retracting reciprocating movement relative to a work support, the combination comprising electrical contactor means for controlling said motor including plugging connections for rapidly stopping the rotation of said motor and said spindle at the end of the advancing movement of the latter, means effective upon the stopping of spindle rotation for causing said contactor means to intermittently energize said motor and thus jog said spindle into a predetermined radial position, an electromagnetic brake for precluding accidental rotation of said spindle, an actuating winding within said brake and adapted when energized to engage the latter, and time responsive control means for energizing said winding when said spindle has reached the predetermined radial position.

3. In a control device for radially positioning a rotatable machine tool spindle having a driving motor, said spindle being mounted for bodily reciprocating movement and limited transverse movement relative to a work support, the combination comprising forward and reverse contactors for controlling said driving motor, means for producing a series of intermittent electrical power impulses, switch means automatically operable at a predetermined point in the relative reciprocating movement between said slide and said work support to cause said contactors to stop said motor and said spindle, additional switch means arranged upon the stopping of said spindle to connect said impulse producing means to one of said contactors, such connection serving to jog said motor successively and thereby rotate said spindle into a predetermined radial position.

4. In a control device for radially positioning a rotatable machine tool spindle having a driving motor, said spindle being mounted for bodily reciprocating movement and limited transverse movement relative to a work support, the combination comprising reversible electrical controls for said driving motor, means for applying a series of intermittent power impulses to said electrical controls, and switch means automatically operable at a predetermined point in the relative reciprocating movement between said spindle and said work support to stop said drive and then connect said impulse applying means to said electrical controls causing the latter to jog said spindle into a predetermined radial position.

5. In a control device for radially positioning a rotatable machine tool spindle carried by a reciprocable slide, said spindle being mounted on said slide for bodily movement therewith, the combination comprising a reversible electric drive for said spindle, and electric control means for selectively actuating said device in either direction of spindle rotation, a limit switch operatively associated with said control means and adapted to stop said drive automatically at a predetermined point in the movement of said slide, and additional limit switches also operatively associated with said control means, said additional limit switches being adapted to selectively and automatically actuate said control means to effect jogging of said spindle into a predetermined radial position.

6. In a control device for radially positioning a machine tool boring spindle having a driving motor and mounted upon a movable slide for reciprocation therewith relative to a work support, the combination of a cam shaft adapted for direct mechanical connection to said spindle, cams mounted in axially spaced pairs on said cam shaft for rotation therewith, cam limit switches arranged for bodily movement into and out of operative engagement with respective pairs of said cams, electrical control means for the motor of said spindle, additional limit switches operable at a predetermined point in the reciprocation of said slide and spindle for causing said motor control means to stop the rotation of said driving motor and said spindle, a positioning solenoid adapted upon the stopping of said spindle to bring one of said cam limit switches into engagement with its associated cam pair, and an impulse producing device for intermittently energizing said motor control means via either of said cam limit switches and thereby successively jogging said spindle driving motor so as to position said spindle radially within a predetermined angular range defined by the angular relationship between said cam pairs.

7. A control device for radially positioning a machine tool spindle having a driving motor and mounted for reciprocation relative to a work support, said device comprising, in combination, a cam shaft adapted for direct mechanical connection to said spindle, angularly adjustable cams mounted in axially spaced pairs on said cam shaft for rotation therewith, normally disengaged limit switches mounted for bodily movement into and out of operative engagement with respective pairs of said cams, electrical control means for the motor of said spindle, additional limit switches operable at a predetermined point in the relative reciprocation between the work support and said spindle for causing said electrical control means to stop the rotation of said spindle together with its driving motor, positioning means operable upon the stopping of said spindle for bringing one of said normally disengaged limit switches into engagement with its associated cam pair, and means for applying to said electrical control means via either of said normally disengaged limit switches when closed a series of timed electrical impulses, said impulse applying means being adapted to jog the spindle driving motor successively and thus position said spindle radially within a predetermined angular range defined by the angular relationship between said cam pairs.

8. A control device for radially positioning a motor driven machine tool spindle mounted for reciprocation relative to a work support, comprising, in combination, a cam shaft adapted for mechanical connection to said spindle, a plurality of angularly adjustable cams mounted on said cam shaft for rotation therewith, limit switches operatively associated with respective ones of said cams for actuation thereby, electrical control means operable at a predetermined point in the relative reciprocation between the work support and said spindle for stopping the rotation of the same together with its driving motor, and means for applying to said electrical control means via either of said limit switches a series of electrical impulses of predetermined duration and periodicity so as to jog the spindle driving motor and position said spindle radially within a predetermined angular range.

GRANT HARDING.

REFERENCES CITED

The following references are of record in the file of this patent:

UNITED STATES PATENTS

| Number | Name | Date |
|---|---|---|
| 2,146,446 | Schmidt et al. | Feb. 7, 1939 |
| 2,170,510 | Trible | Aug. 22, 1939 |